(12) United States Patent
Park et al.

(10) Patent No.: US 12,495,823 B2
(45) Date of Patent: Dec. 16, 2025

(54) FOOD COMPOSITION FOR ENHANCING IMMUNE FUNCTION INCLUDING FERMENTED NONI POLYSACCHARIDE EXTRACT AND METHOD OF PREPARING THE SAME

(71) Applicant: NSTBIO. CO., LTD., Gimpo-si (KR)

(72) Inventors: Eun Young Park, Incheon (KR); Yong Deok Kim, Incheon (KR); Soo Jin Kim, Incheon (KR); Eun Min Kim, Incheon (KR); Ji Soo Choi, Incheon (KR); Hee Yeon Kwon, Seoul (KR); Im Joung La, Incheon (KR); Jae Yeon Lee, Suwon-si (KR); Sunil Choi, Chuncheon-si (KR); Xionggao Han, Chuncheon-si (KR); Xiao Men, Chuncheon-si (KR); Sejeong Lee, Seongnam-si (KR); Geon Oh, Sejong-Si (KR); Ok Hwan Lee, Chuncheon-si (KR); Seung Hyung Kim, Daejeon (KR); Geum Su Seong, Seocheon-gun (KR)

(73) Assignee: NSTBIO. CO., LTD., Gimpo-si (KR)

( * ) Notice: Subject to any disclaimer, the term of this patent is extended or adjusted under 35 U.S.C. 154(b) by 418 days.

(21) Appl. No.: 18/343,692

(22) Filed: Jun. 28, 2023

(65) Prior Publication Data
US 2024/0008518 A1    Jan. 11, 2024

(30) Foreign Application Priority Data
Jul. 6, 2022  (KR) ........................ 10-2022-0082959

(51) Int. Cl.
*A23L 33/135*   (2016.01)
*A23L 33/125*   (2016.01)
*C12G 3/026*    (2019.01)

(52) U.S. Cl.
CPC ........... *A23L 33/135* (2016.08); *A23L 33/125* (2016.08); *C12G 3/026* (2019.02)

(58) Field of Classification Search
None
See application file for complete search history.

(56) References Cited

FOREIGN PATENT DOCUMENTS

KR    10-2022-0071718 A    5/2022

OTHER PUBLICATIONS

An Office Action issued by Taiwan Intellectual Property Office on Feb. 23, 2024, which corresponds to Taiwanese Patent Applicatin No. 112124165 and is related to U.S. Appl. No. 18/343,692.
Yen-Ping Wang, "Anti-oxidative and anti-cancer activities of noni (*Morinda citrifolia* L.) juice and ethanol extracts", Master Thesis, Graduate Institute of Food Science, Tunghai University, Taiwan, Jul. 31, 2012, whole document, pp. 45, 49, 59, 64 and 89.
Choi, Sun-Il et al.; "Development and Validation of an Analytical Method for Deacetylasperulosidic Acid, Asperulosidic Acid, Scopolin, Asperuloside and Scopoletin in Fermented *Morinda citrifolia* L. (Noni)"; MDPI, Separation; 2021; Total 13 Pages; vol. 8.
Hirazumi, Anne et al.; "An immunomodulatory polysaccharide-rich substance from the fruit juice of *Morinda citrifolia* (noni) with antitumour activity"; Phytotherapy Research; August 1999; Total 10 Pages.
Choi, Sun-Il et al.; "Immunomodulatory Effect of Polysaccharide from Fermented *Morinda citrifolia* L. (Noni) on RAW 264.7 Macrophage and Balb/c Mice"; MDPI, Foods; 2022; pp. 1-15.

*Primary Examiner* — Jyoti Chawla
(74) *Attorney, Agent, or Firm* — Studebaker Brackett PLLC

(57) ABSTRACT

The present invention relates to a food composition for enhancing immune function, which includes a fermented noni polysaccharide extract, and a method of preparing the same. The present invention may provide a polysaccharide extract prepared from a fermented noni extract. The present invention may provide a fermented noni polysaccharide extract, in which when the polysaccharide extract aqueous solution is provided at a concentration of 200 μg/mL to RAW264.7 macrophages, an NO production value is 200% to 500% relative to RAW264.7 macrophages to which the polysaccharide extract solution is not provided.

10 Claims, 7 Drawing Sheets

FOOD COMPOSITION FOR ENHANCING IMMUNE FUNCTION INCLUDING FERMENTED NONI POLYSACCHARIDE EXTRACT AND METHOD OF PREPARING THE SAME

CROSS-REFERENCE TO RELATED APPLICATION

This application claims priority to and the benefit of Korean Patent Application No. 10-2022-0082959, filed on Jul. 6, 2022, the disclosure of which is incorporated herein by reference in its entirety.

BACKGROUND

1. Field of the Invention

The present invention relates to a food composition for enhancing immune function, which includes a fermented noni polysaccharide extract, and a method of preparing the same.

2. Discussion of Related Art

Immunity is a self-defense system that is present in the body, and a process in which the human body recognizes a variety of materials or organisms invading from the outside as foreign substances, removes them, and metabolizes them.

In order to treat diseases caused by reduced immunity due to industrialization, environmental pollution, and aging, it is necessary to develop easily edible foods or health functional foods that can be managed in advance rather than pharmaceutical treatments.

Functionality-recognized ingredients for enhancing immune function, which are currently registered in the Ministry of Food and Drug Safety include ginseng, red ginseng, L-glutamine, germanium yeast, shiitake mushroom mycelium, yeast beta-glucan, and a ginseng polysaccharide extract. Among such studies, only immunity enhancement studies simply on a composition have been conducted, and research on developing materials for enhancing bioavailability using microorganisms (lactic acid bacteria) with excellent bioconversion ability and optimizing the process of extracting a polysaccharide with excellent immunological efficacy is insufficient.

Recently, as interest in health increases, research on the development of various health functional foods using natural substances with excellent physiological activity in the body and a low risk of side effects is being actively conducted. In addition, due to the wide spread of COVID-19, global interest in immune function has greatly increased, and many related studies are being conducted.

SUMMARY OF THE INVENTION

The present invention is directed to providing a polysaccharide extract that effectively enhances immune function by fermenting noni (*Morinda citrifolia*).

The present invention is also directed to providing a method of preparing a fermented noni polysaccharide extract which effectively enhances immune function.

To achieve the above-described object, the present invention provides a polysaccharide extract prepared from a fermented noni extract. The present invention may provide a fermented noni polysaccharide extract in which, when the polysaccharide extract aqueous solution is provided at a concentration of 200 μg/mL to RAW264.7 macrophages, an NO production value is 200% to 500% relative to RAW264.7 macrophages to which the polysaccharide extract solution is not provided.

In one embodiment, the fermented noni is prepared by inoculating noni with at least one strain of *Lactobacillus plantarum*, *Bifidobacterium lactis*, *Lactobacillus rhamnosus*, *Lactobacillus casei*, *Lactobacillus fermentum*, *Bifidobacterium breve*, and *Lactococcus lactis* subsp. *lactis*, and the polysaccharide extract may be prepared by mixing the fermented noni extract with ethanol for alcoholic beverage production and then drying the resulting precipitate.

In one embodiment, the fermented noni is prepared by inoculation with the strain of Accession No. KCCM12965P, and the polysaccharide extract may be prepared by drying a precipitate produced after mixing the fermented noni extract with ethanol for alcoholic beverage production.

In one embodiment, the solid content of the fermented noni extract may be 5 to 40 Brix.

In one embodiment, the concentration of the ethanol for alcoholic beverage production may be 90 to 97%, and the mixing ratio of the fermented noni extract and the ethanol for alcoholic beverage production may be 1:3 to 1:7.

In addition, the present invention may provide a food composition for enhancing immune function, which includes the fermented noni polysaccharide extract.

In addition, the present invention may provide a method of preparing a fermented noni polysaccharide extract, which includes performing fermentation and aging by inoculating noni with lactic acid bacteria, preparing a fermented noni extract from the fermented noni obtained by fermentation and aging, obtaining a polysaccharide precipitate after mixing the fermented noni extract with ethanol for alcoholic beverage production, and obtaining a dry powder of the fermented noni polysaccharide extract using the polysaccharide precipitate.

DETAILED DESCRIPTION OF EXEMPLARY EMBODIMENTS

Figure 1:
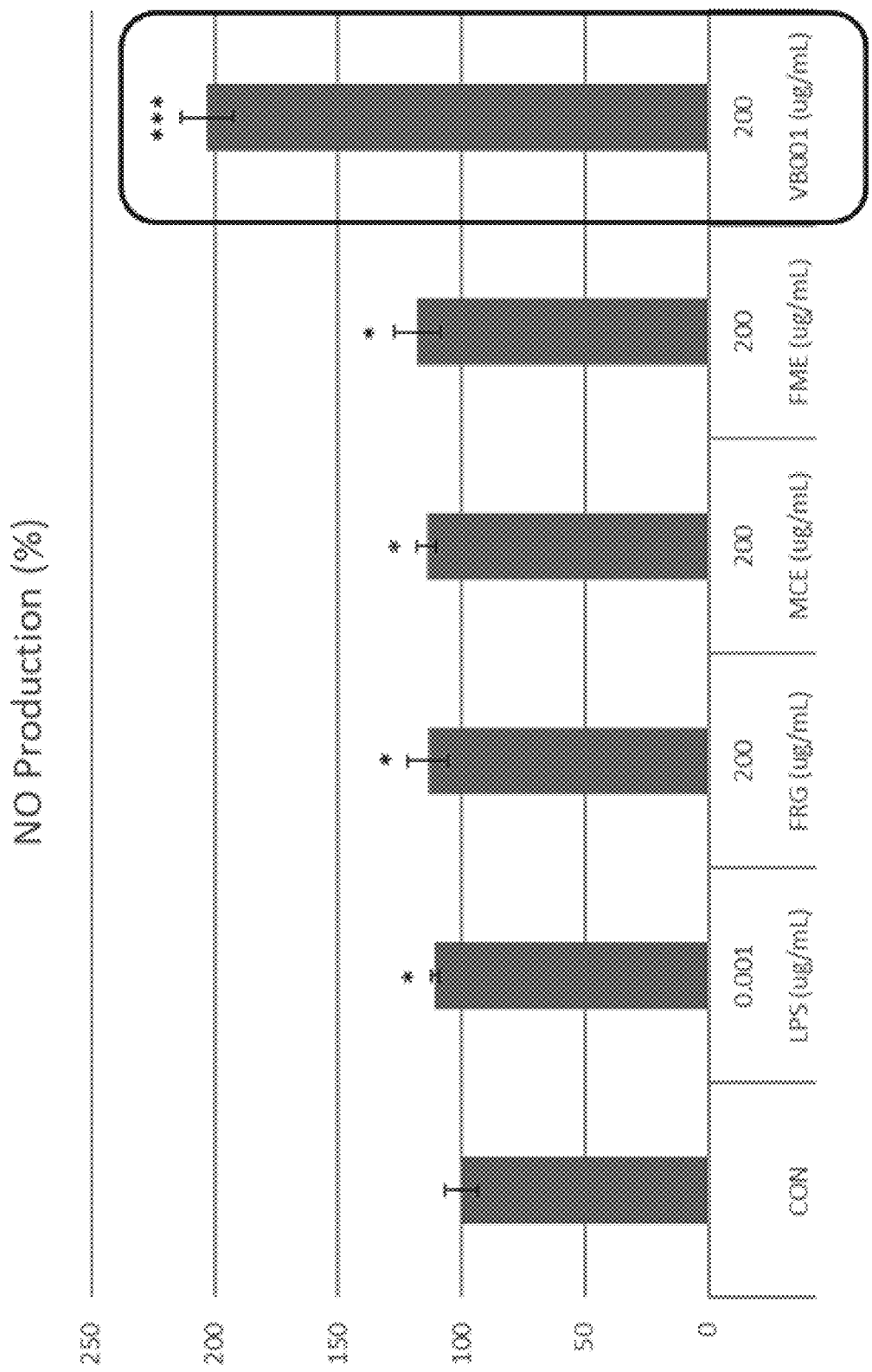
FIG. 1 is a graph illustrating the result of measuring NO production according to Experimental Example 1.

Hereinafter, embodiments disclosed in the specification will be described in detail with reference to the accompanying drawings, but like numerals denote the same or like components regardless of reference numerals, and overlapping descriptions thereof will be omitted. In addition, in describing the embodiments disclosed in the specification, if it is determined that detailed descriptions of related known technologies may obscure the gist of the embodiments disclosed herein, the detailed descriptions will be omitted. In addition, the accompanying drawings are merely provided to easily understand the embodiments disclosed in the specification, but the technical idea disclosed in the specification is not limited by the accompanying drawings, and it should be understood that the technical idea includes all modifications, equivalents or alternatives within the spirit and technical scope of the present invention.

The ordinal numbers, for example, "first" and "second," may be used to describe various components, but the components should not be limited by these terms. The terms are used only to distinguish one component from another component.

Singular expressions include plural expressions unless clearly indicated otherwise in the context.

In the specification, it should be understood that the term "include" or "have" is intended to indicate the presence of a characteristic, number, step, action, component or part described in the specification, or a combination thereof, but does not preclude the possibility of the presence or addition of one or more other characteristics, numbers, steps, actions, components, parts or a combination thereof.

The present invention relates to a method of preparing a fermented noni polysaccharide extract, and a food composition for enhancing immune function, which includes a fermented noni polysaccharide extract.

The "fermented noni" used in the specification refers to one that is fermented and aged for a predetermined period after inoculating noni with lactic acid bacteria.

The "fermented noni extract" used in the specification refers to an extraction juice of the fermented noni or a liquid obtained by performing at least one process of concentration and dilution on the extraction juice.

The "fermented noni polysaccharide extract" in the specification refers to a composition obtained by applying a physical, chemical, biochemical, or biotechnological technique to the fermented noni extract.

The "food composition for enhancing immune function" used in the specification refers to a food group in which added value has been added to food so that the function of a corresponding food can act and be expressed for a specific purpose using a physical, biochemical, or biotechnological technique, or a food processed after being designed to sufficiently express body regulatory functions, relating to biodefense rhythm, disease prevention, and recovery, of a food composition in a living organism.

In the specification, in the food composition for enhancing immune function, various foods, beverages, gum, tea, vitamin complexes, and functional foods are included. Further, the present invention may contain various nutrients, vitamins, minerals (electrolytes), flavoring agents including synthetic and natural flavoring agents, coloring agents, fillers (cheese, chocolate, etc.), pectic acid and a salt thereof, alginic acid and a salt thereof, organic acids, protective colloidal thickening agents, pH adjustors, stabilizers, preservatives, glycerin, alcohols, or carbonizing agents used in soda, and such components may be used independently or in combination. The component may be added in an appropriate amount within a range that does not impair the immune-enhancing function of the fermented noni polysaccharide extract according to the present invention. For example, the component may be included at 0.1 to 1 wt % based on the total weight of the food composition for enhancing immune function.

In addition, in the food composition for enhancing immune function, a food supplement acceptable in food science may be included, and an appropriate carrier, excipient, and diluent conventionally used in the preparation of the food composition for enhancing immunity may be further included.

The composition for enhancing immunity, which may be formed in a beverage, granule, tablet, powder, pill, or capsule, is easy to carry and can be taken anytime anywhere.

Hereinafter, a method of preparing the fermented noni polysaccharide extract according to the present invention will be described in detail.

The preparation method according to the present invention may include (S1) performing fermentation and aging by inoculating noni fruit with lactic acid bacteria, (S2) preparing a fermented noni extract from the fermented noni obtained by fermentation and aging, (S3) obtaining a polysaccharide precipitate after mixing the fermented noni extract with ethanol for alcoholic beverage production, and (S4) obtaining a dry powder of the fermented noni polysaccharide extract using the polysaccharide precipitate.

(S1)

In S 1, noni fruit may be fermented and aged by inoculation with lactic acid bacteria. The lactic acid bacteria used to ferment the noni fruit may be complex lactic acid bacteria including at least one of the following seven kinds of lactic acid bacteria.

(1) *Lactobacillus plantarum*
(2) *Bifidobacterium lactis*
(3) *Lactobacillus rhamnosus*
(4) *Lactobacillus casei*
(5) *Lactobacillus fermentum*
(6) *Bifidobacterium breve*
(7) *Lactococcus lactis* subsp. *lactis*

Here, the seven kinds of lactic acid bacteria may be mixed at proportions of 60 to 65 wt % (*Lactobacillus plantarum*), 10 to 15 wt % (*Bifidobacterium lactis*), 1 to 10 wt % (*Lactobacillus casei*), 1 to 10 wt % (*Lactobacillus fermentum*), 1 to 10 wt % (*Bifidobacterium breve*), and 1 to 10 wt % (*Lactococcus lactis* subsp. *lactis*).

When one of the mixing proportions of the 7 kinds of lactic acid bacteria do not satisfy the above range, the fermentation of the noni fruit may not be properly performed.

In addition, the noni fruit fermented by the complex lactic acid bacteria including the 7 kinds of lactic acid bacteria mixed at the above proportions may be stored for a long time due to an increased digestion-absorption rate and increased storability by a material that acts as an enzyme and natural preservative produced in fermentation, whereas when the proportions of the complex lactic acid bacteria outside the above range, such advantages may not be shown.

Meanwhile, during the fermentation of the noni fruit, the strain of Accession No. KCCM12965P (*Lactobacillus brevis* NST707) may be applied. When the noni fruit is fermented by the strain of Accession No. KCCM12965P, results similar to those obtained when the noni fruit is fermented by the 7 kinds of lactic acid bacteria may be obtained.

The lactic acid bacteria may be used to inoculate the noni fruit in the form of a lactic acid bacterial broth, and preferably, a lactic acid bacterial solution. Here, with respect to 100 parts by weight of the noni fruit, 0.1 to 0.5 parts by weight of the lactic acid bacteria may be inoculated. When the inoculation amount of the lactic acid bacterial solution is satisfied, the bioconversion described above is smoothly performed, and fermented noni containing a component showing a significant effect on immune enhancement may be obtained.

Meanwhile, the viable lactic acid bacterial cell count may be $1 \times 10^9$ to $5 \times 10^9$ cfu/g, and preferably, $2.4 \times 10^9$ cfu/g.

Meanwhile, the fermentation and aging may be performed at 35 to 40° C. for 600 hours or more. Specifically, the fermentation may prevent the generation of fungi and homogenize a fermentation broth by fermentation and aging for 600 hours or more from the starting date of the fermentation.

The fermentation and aging temperatures may be 35 to 40° C. When the fermentation and aging temperatures are less than 30° C., fermentation may not be normally performed, and when the fermentation and aging temperatures are more than 40° C., due to prolonged fermentation and aging time, lactic acid bacteria may die.

In one embodiment, the aging may be performed by pouring the fermentation broth generated in the fermentation on the top of the fermentation product at regular intervals. Preferably, the aging may be carried out by pouring the fermentation broth on the top of the fermentation product at intervals of 5 to 10 days.

(S2)

In S2, a concentrated fermented noni extract may be prepared from fermented noni obtained by fermentation and aging.

First, the fermented noni obtained by fermentation and aging may be extracted.

Here, the noni fruit and the fermentation broth may both be included in the fermented noni that has been undergone fermentation and aging. Meanwhile, before extraction, preheating the fermented noni may be further included. The preheating may be performed by heating the fermented noni at a low temperature, and due to preheating, a juice yield may be increased by softening the fiber of the fermented noni, and nutrients may be well extracted from the fermented noni.

Here, the preheating temperature is preferably 70 to 80° C. When the preheating temperature is less than 60° C., since there is no change in fiber state in the fermented noni, the effect of improving a juice yield may not be expected, and when the preheating temperature is more than 80° C., the fermented noni may be denatured, or lactic acid bacteria in the fermented noni may be sterilized.

Particularly, when the preheating temperature is 90° C. or more, 90% or more of the lactic acid bacteria may be sterilized. In addition, the preheating time is preferably 1 to 2 hours. When the preheating time is less than 30 minutes, there is no change in fiber state in the fermented noni, so the effect of improving a juice yield may not be expected. When the preheating time is more than 2 hours, the fermented noni may be denatured, or the lactic acid bacteria in the fermented noni may die.

By the juice extraction, a fermented noni extract may be prepared by extracting noni fruit included in the fermented noni and the fermentation broth. Here, the juice extraction may be performed by pressurizing the fermented noni, and the appropriate pressure during the juice extraction is preferably 0.05 to 7 bar. When the pressure during the juice extraction is less than 0.05 bar, the juice extraction is improperly performed, resulting in a lower yield, whereas when the pressure during the juice extraction is more than 7 bar, by-products of the noni fruit are also mixed, resulting in a lower purity extract.

In addition, after juice extraction, additional filtration and sterilization may improve purity, thus reinforcing the reliability of a product.

The filtration may be performed using a filter having a pore diameter of 10 to 30 mesh. When the pore diameter of the filter is less than 10 mesh, process efficiency may be lowered, whereas when the pore diameter of the filter is more than 30 mesh, the filtered fermented noni extract may still contain by-products.

For sterilization, any of the sterilization methods generally used in the art may be widely used without limitation.

After juice extraction, moisture contained in the fermented noni extract may be evaporated, thereby concentrating the fermented noni extract. As an example, the fermented noni extract may be concentrated up to 70 Brix.

More specifically, a concentrate may be prepared by concentrating the fermented noni extract to 70(±2) Brix at 60 to 65° C. Here, the Brix value may be measured using a saccharometer (PAL-3, ATAGO).

Afterward, a diluted liquid (fermented noni extract) was prepared by mixing the concentrated fermented noni concentrate with distilled water.

Here, the solid content of the fermented noni extract may be 5 to 40 Brix. When the solid content of the fermented noni extract is less than 5 Brix, the yield of the polysaccharide extract, which will be described below, is significantly lowered, and when the solid content of the fermented noni extract is more than 40 Brix, the immune-enhancing function of the polysaccharide extract, which will be described below, is significantly reduced.

(S3)

In S3, a polysaccharide precipitate may be obtained by mixing the fermented noni extract with ethanol.

Specifically, a polysaccharide precipitate may be obtained by mixing the fermented noni extract having a Brix 5 to 40 with ethanol for alcoholic beverage production and then letting it stand.

Here, the concentration of the ethanol for alcoholic beverage production may be 90 to 97%. Preferably, the concentration of the ethanol for alcoholic beverage production may be 95%.

Meanwhile, the fermented noni extract and the ethanol for alcoholic beverage production may be mixed in a volume ratio of 1:3 to 1:7.

Moreover, the standing may continue for more than 24 hours.

After standing, a supernatant may be removed, thereby obtaining a polysaccharide extract.

(S4)

In S4, a dry powder of the fermented noni polysaccharide extract is obtained from the polysaccharide precipitate.

Specifically, the polysaccharide extract is dissolved by removing the supernatant and mixing with distilled water. Afterward, a dry powder of the polysaccharide may be obtained by concentration and drying under reduced pressure.

A food composition for enhancing immune function may be prepared in various forms by mixing the dry powder of the polysaccharide with the above-described additives and processing the mixture.

Hereinafter, to help in understanding the present invention, exemplary examples will be suggested. However, it should be understood that the examples are not provided to limit the scope of the present invention and all alternatives and modifications within the scope of the accompanying claims are included in the present invention.

EXAMPLES

One hundred kilograms of noni was inoculated with lactic acid bacteria broth (0.3 kg), and fermented at 37° C. for 4 weeks.

The lactic acid bacteria broth includes complex lactic acid bacteria (7 kinds of NST complex lactic acid bacteria 100, LactoMason). Fermented noni was prepared by fermentation and aging while spraying 10 L of fermentation broth on top of the noni fruit every 7 days from the starting day of fermentation.

Here, the composition of the complex lactic acid bacteria (7 kinds of NST complex lactic acid bacteria 100) used is shown in Table 1 below.

TABLE 1

| NO. | Complex lactic acid bacterial ingredient | Mixing ratio |
|---|---|---|
| 1 | *Lactobacillus plantarum* KCCM11821P | 63% |
| 2 | *Bifidobacterium lactis* | 12% |
| 3 | *Lactobacillus rhamnosus* | 5% |
| 4 | *Lactobacillus casei* | 5% |
| 5 | *Lactobacillus fermentum* | 5% |
| 6 | *Bifidobacterium breve* | 5% |
| 7 | *Lactococcus lactis* subsp. *lactis* | 5% |

The fermented noni was preheated at 78° C. for 1.5 hours, and extracted using juice extraction equipment under a pressure of 4 bar.

Afterward, filtration and sterilization were performed using a 20-mesh filter, followed by concentration, thereby preparing a 70-Brix fermented noni concentrate.

Then, a diluted liquid was prepared by mixing the fermented noni concentrate with distilled water as shown in Table 2 below.

TABLE 2

| NO. | Amount of 70-Brix fermented noni concentrate used (mL) | Amount of distilled water used (mL) | Final solid content (Brix) |
|---|---|---|---|
| Preparation Example 1 | 5 | 65 | 5 |
| Preparation Example 2 | 10 | 60 | 10 |
| Preparation Example 3 | 20 | 50 | 20 |
| Preparation Example 4 | 30 | 40 | 30 |
| Preparation Example 5 | 50 | 30 | 40 |
| Preparation Example 6 | 60 | 10 | 60 |
| Preparation Example 7 | 70 | 0 | 70 |

A dry polysaccharide powder was prepared using each of Preparation Examples 1 to 7 shown in Table 2.

Specifically, 10 mL of each of the fermented noni extracts according to Preparation Examples 1 to 7 and 50 mL of 95% ethanol for alcoholic beverage production were added and allowed to stand for 24 hours.

Subsequently, after removing a supernatant, 10 mL of distilled water was added to dissolve a polysaccharide precipitate.

Afterward, a liquid in which the polysaccharide precipitate was dissolved was concentrated and dried under reduced pressure to obtain a dry polysaccharide powder. The result of obtaining the dry polysaccharide powder is shown in Table 3 below. Table 3 below shows the result of repeating an experiment of obtaining the dry polysaccharide powder from each of the fermented noni extracts according to Preparation Examples 1 to 7 three times.

TABLE 3

| NO. | Fermented noni extract | Amount of precipitate obtained (g) | Yield (%) |
|---|---|---|---|
| Example 1 | Preparation Example 1 | 0.06 ± 0.1 | 10.97 ± 2.58 |
| Example 2 | Preparation Example 2 | 0.22 ± 0.04 | 21.09 ± 3.42 |
| Example 3 | Preparation Example 3 | 0.59 ± 0.04 | 29.96 ± 1.83 |
| Example 4 | Preparation Example 4 | 1.00 ± 0.08 | 32.24 ± 2.59 |
| Example 5 | Preparation Example 5 | 1.65 ± 0.14 | 43.90 ± 3.66 |
| Comparative Example 1 | Preparation Example 6 | 4.56 ± 0.22 | 80.28 ± 3.84 |
| Comparative Example 2 | Preparation Example 7 | 6.78 ± 0.12 | 97.30 ± 1.69 |

Experimental Example 1: Measurement of NO Production of Health-Enhancing Food Composition Immune-enhancing effects of fermented red ginseng, a noni extract, a fermented noni extract, and a fermented noni polysaccharide extract (Example 5) were compared.

Specifically, in Experimental Example 1, the NO production effect of each sample was measured in RAW264.7 macrophages.

An experimental method of measuring NO production is shown below.
1) RAW264.7 cells were seeded in a 96-well plate at $1 \times 10^6$ cells/mL, and cultured in a 5% $CO_2$ incubator at 37° C. for 24 hours.
2) The cells were treated with each sample and incubated in a 5% $CO_2$ incubator at 37° C. for 24 hours. Here, all samples were treated at a concentration of 200 µg/mL.
3) After 100 µL of a supernatant was collected and transferred to a 96-well plate, 100 µL of Griess reagent (1% sulfanilamide in 5% phosphoric acid and 1% α-naphthylamide in $H_2O$) was added and allowed to react at room temperature for 10 minutes.
4) Absorbance was measured at 540 nm using a microplate reader.

Meanwhile, a method of preparing each sample in 2) is as follows.

Method of preparing FME sample: 100 g of noni was fermented with 500 mL of distilled water and 2% ($8 \times 10^{11}$ CFU/g) each of 7 kinds of NST complex lactic acid bacteria 100 (shown in Table 1) at 30° C. for 72 hours. Afterward, a fermented noni extract (FME) was obtained through filtration and freeze drying.

Method of preparing MCE sample: A noni extract (MCE) was obtained in the same manner as in the FME preparation method, except for the treatment with the 7 kinds of NST complex lactic acid bacteria 100.

Method of preparing FRG sample: 100 g of a commercially available red ginseng concentrate was fermented with 1 L of distilled water and 2% *Lactobacillus plantarum* at 37° C. for 24 hours, and subjected to filtration and freeze drying, thereby obtaining a fermented red ginseng extract (FRE).

All samples were used after being added to sterilized secondary distilled water, sonicated for 10 minutes, and filtered with a 0.22 µm PVDF filter (Millex-HV, Millipore, Bedford, MA, USA).

FIG. 1 is a graph illustrating the result of measuring NO production according to Experimental Example 1.

Materials illustrated in FIG. 1 are as follows:
LPS: Lipopolysaccharide
FRG: Fermented red ginseng extract
MCE: Noni extract (*Morinda citrifolia* extract)

FME: Fermented noni extract (Fermented *Morinda citrifolia* extract)

VB001: Fermented noni polysaccharide extract (Fermented *Morinda citrifolia* polysaccharide extract)

Referring to FIG. 1, it can be confirmed that the fermented noni polysaccharide extract according to the present invention has a higher NO production value than the fermented noni extract obtained through juice extraction of the fermented noni and the unfermented noni extract.

In addition, it can be confirmed that the fermented noni polysaccharide extract according to the present invention has a higher NO production value than the lipopolysaccharide or the fermented red ginseng.

Nitric oxide (NO) produced in immune cells in the body is an important neurotransmitter that acts as a defense in the immune system, and is produced in the process of converting L-arginine into L-citrulline by nitric oxide synthetase (NOS). NO plays a role in promoting the secretion of cytokines through a non-specific host defense mechanism, such as phagocytosis, anti-proliferation activity of bacteria and cancer cells, or signal transduction between immune cells. Accordingly, in an in vitro experiment using RAW264.7 macrophages, an increase in the amount of NO production indicates activation of the primary immune system.

Based on the experimental results, it can be confirmed that the fermented noni polysaccharide extract according to the present invention has excellent immune-enhancing efficacy. Particularly, it can be confirmed that the fermented noni polysaccharide extract according to the present invention has excellent immune-enhancing efficacy, compared to the fermented noni extract obtained by juice extraction of the fermented noni.

Hereinafter, additional experimental examples that can confirm the effect of a fermented noni extract according to the present invention will be described.

Experimental Example 2: Evaluation of Cytotoxicity for Examples 1 To 5, and Comparative Examples 1 and 2

The cell viability of the fermented noni polysaccharide extract was measured in RAW264.7 macrophages.

An experimental method of evaluating cytotoxicity is as follows.
1) RAW264.7 cells were seeded in a 96-well plate at $1 \times 10^6$ cells/mL, and cultured in a 5% $CO_2$ incubator at 37° C. for 24 hours.
2) The cells were treated with each of the samples according to Examples and Comparative Examples in a 5% $CO_2$ incubator at 37° C. for 48 hours. Here, all samples were used after addition to sterilized secondary distilled water at a concentration of 200 mg/mL, sonication for 10 minutes, and filtration with a 0.22 μm PVDF filter (Millex-HV, Millipore, Bedford, MA, USA).
3) The resulting cells were treated with an MTS cell viability assay reagent (Promega, G3580) corresponding to 10% of a medium volume, and reacted in a $CO_2$ incubator for 2 hours.
4) Absorbance was measured at 490 nm using a microplate reader.

Figure 2:
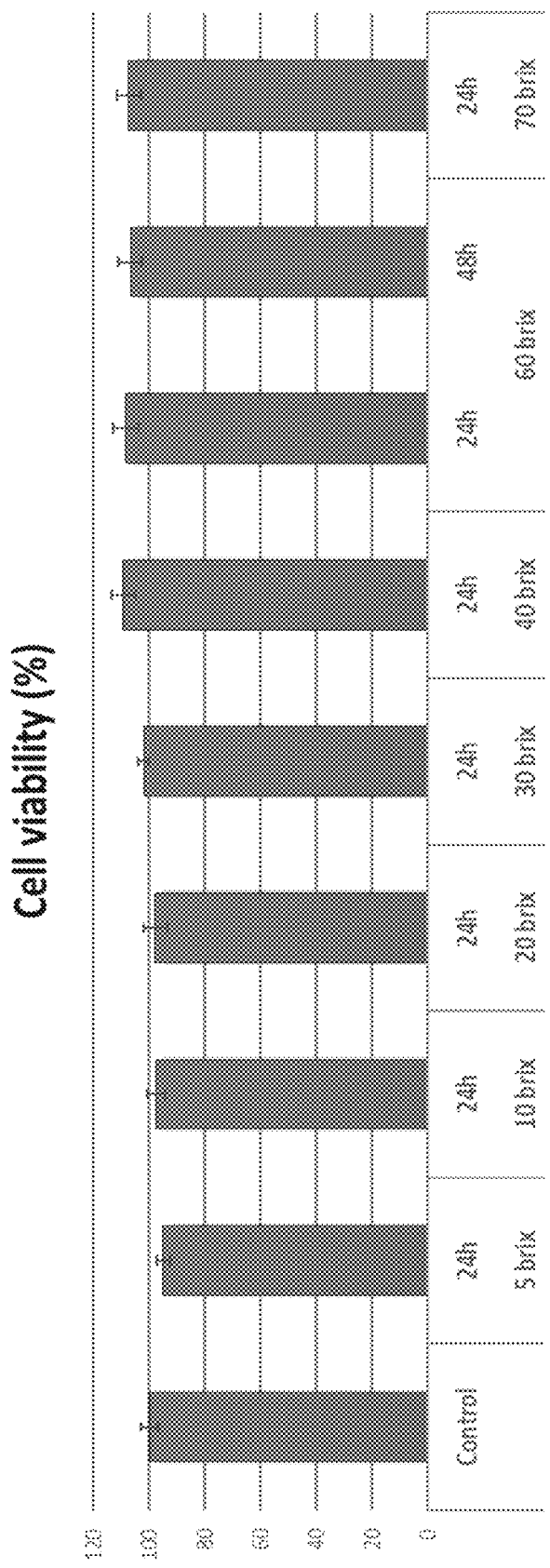
FIG. 2 is a graph illustrating the result of evaluating cytotoxicity according to Experimental Example 2.

FIG. 2 is a graph showing the result of evaluating cytotoxicity according to Experimental Example 2.

In the graph shown in FIG. 2, the solid content (Brix) of the fermented noni extract used in the preparation of a polysaccharide extract and the standing time described in the Example are shown on the X axis.

Referring to FIG. 2, the cytotoxicity of each of Examples 1 to 5 and Comparative Example 1 and 2 was not confirmed.

Experimental Example 3: Measurement of NO Production for Examples 1 to 5, and Comparative Examples 1 and 2

The NO production for Examples 1 to 5 and Comparative Examples 1 and 2 shown in Table 3 were measured.

An experimental method of measuring NO production is as follows.
1) RAW264.7 cells were seeded in a 96-well plate at $1 \times 10^6$ cells/mL, and cultured in a 5% $CO_2$ incubator at 37° C. for 24 hours.
2) The cells were treated with each of the samples according to Examples and Comparative Examples in a 5% $CO_2$ incubator at 37° C. for 48 hours. Here, all samples were used after addition to sterilized secondary distilled water at a concentration of 200 mg/mL, sonication for 10 minutes, and filtration with a 0.22 μm PVDF filter (Millex-HV, Millipore, Bedford, MA, USA).
3) After 100 μL of a supernatant was collected and transferred to a 96-well plate, 100 μL of Griess reagent (1% sulfanilamide in 5% phosphoric acid and 1% α-naphthylamide in $H_2O$) was added and allowed to react at room temperature for 10 minutes.
4) Absorbance was measured at 540 nm using a microplate reader.

Figure 3:
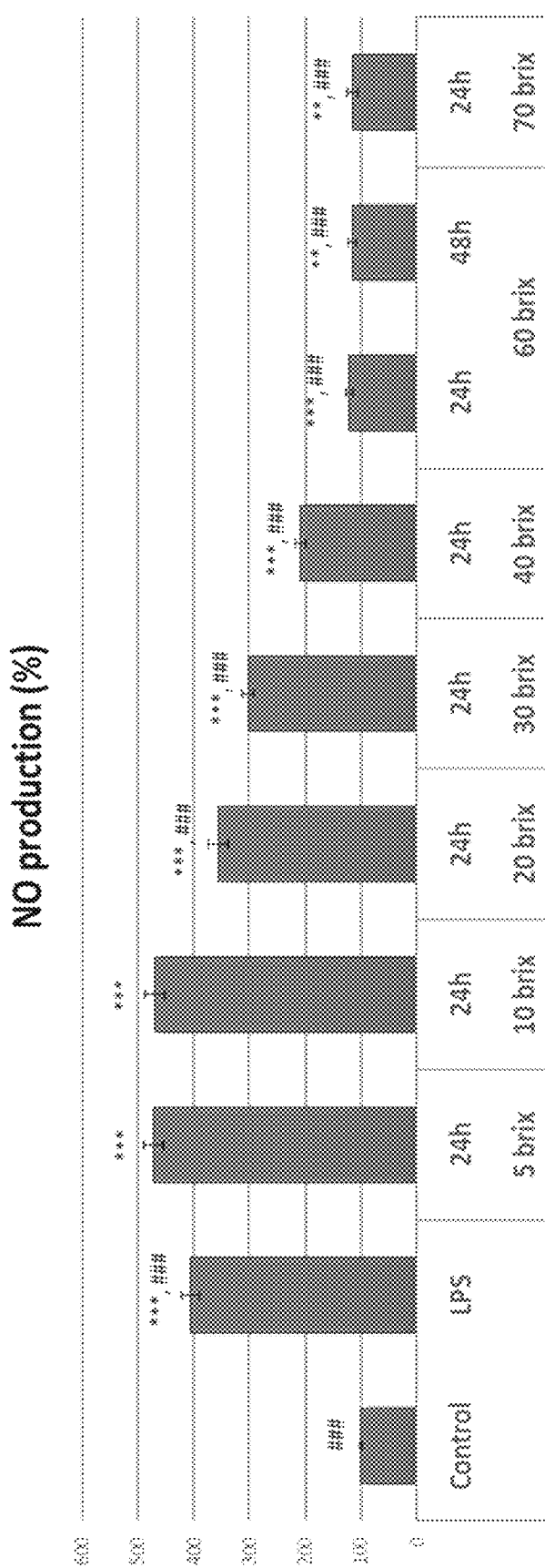
FIG. 3 is a graph illustrating the result of measuring NO production according to Experimental Example 3.

FIG. 3 is a graph illustrating the result of measuring NO production according to Experimental Example 3.

In the graph shown in FIG. 3, the solid content (Brix) of the fermented noni extract used in the preparation of a polysaccharide extract and the standing time described in the example are shown on the X axis.

In addition, in FIG. 3, data is expressed by means±S.D, and significant differences are shown as *$p<0.05$, $p<0.01$, and *$p<0.001$ by statistically multiple comparisons with the control group.

On the other hand, when comparing the 10-Brix fermented noni extract only with the untreated control by a mutual T-TEST, a significant difference is shown as ###$p<0.001$.

Meanwhile, it can be confirmed that Comparative Examples 1 and 2 have a relatively decreased immune-enhancing effect.

Referring to FIG. 3, as shown in Examples 1 and 2, the fermented noni polysaccharide extract obtained under the condition of a low solid content exhibited the best immune-enhancing efficacy. This result is expected to be caused by a decrease in material inhibiting immune enhancement under a condition of a low solid content.

Experimental Example 4: Evaluation of Yield, NO Production and Cytotoxicity According to Mixing Ratio of Ethanol for Alcoholic Beverage Production After polysaccharide extracts were prepared at different mixing ratios of a fermented noni extract (solid content: 10 Brix) and 95% ethanol for alcoholic beverage production, production yields, total sugar contents, NO production, and cytotoxicity were measured.

The rest of the preparation method, except for the mixing ratio of ethanol for alcoholic beverage production is the same as in the example described above, the methods of measuring NO production and cytotoxicity are the same as in Experimental Examples 1 to 3.

Measurement of a total sugar content is as follows.
1) A polysaccharide sample prepared at 0.5 mg/mL and 0.1 mL of a glucose standard solution for each concentration were added to a 1.5 mL tube.
2) 0.1 mL of a 5% phenol reagent was added and then subjected to vortexing.
3) 0.5 mL of concentrated sulfuric acid was added and then subjected to vortexing (dehydration)
4) The resulting mixture was left for 20 minutes and waiting was performed until the tube cooled down.
5) A reaction solution was added by 0.2 mL into a 96-well microplate, and absorbance was measured at 490 nm.
6) A total sugar content in the sample was calculated using a glucose standard solution standard curve.

Figure 4:
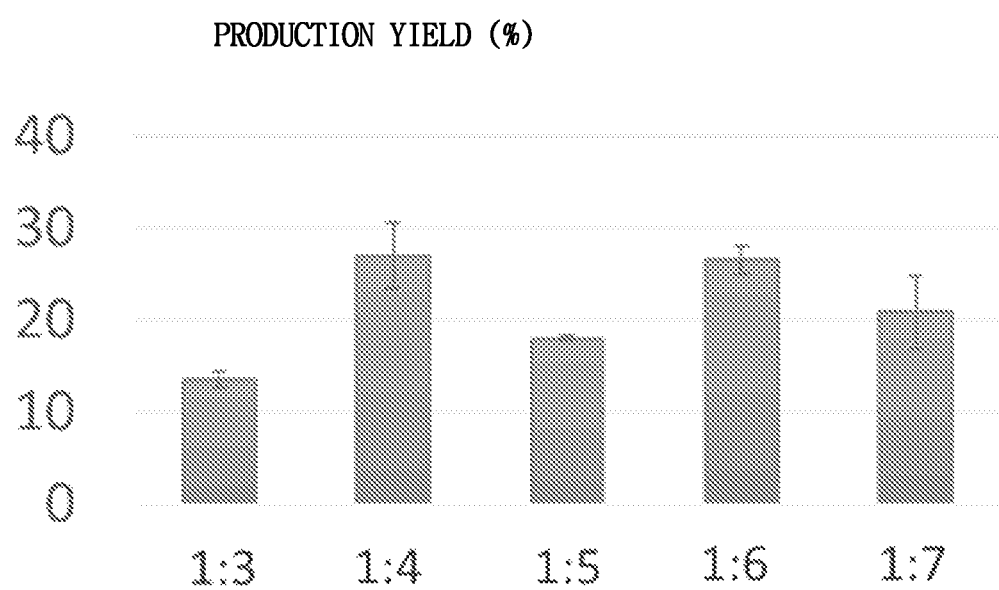
FIG. 4 is a graph illustrating the production yield according to a mixing ratio of ethanol for alcoholic beverage production.
Figure 5:
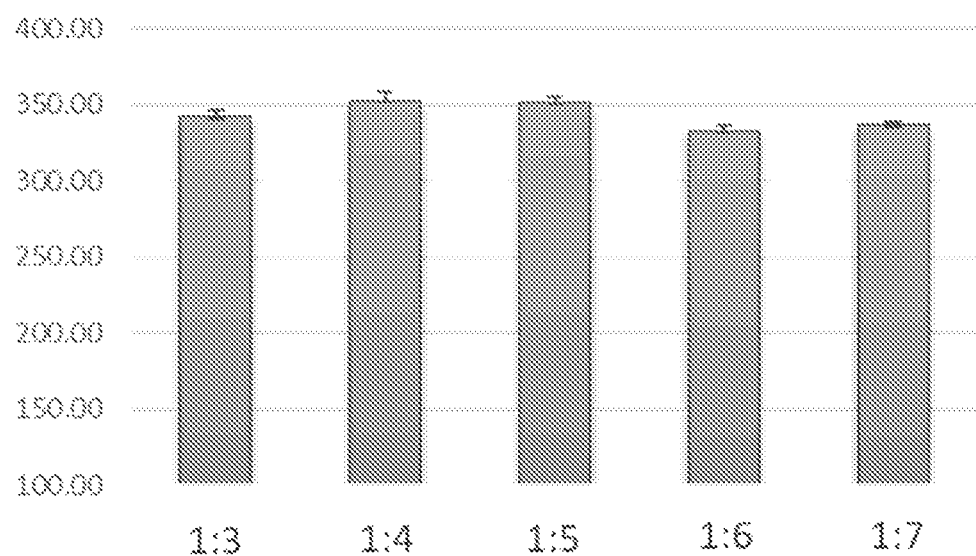
FIG. 5 is a graph illustrating a total sugar content according to the mixing ratio of ethanol for alcoholic beverage production.
Figure 6:
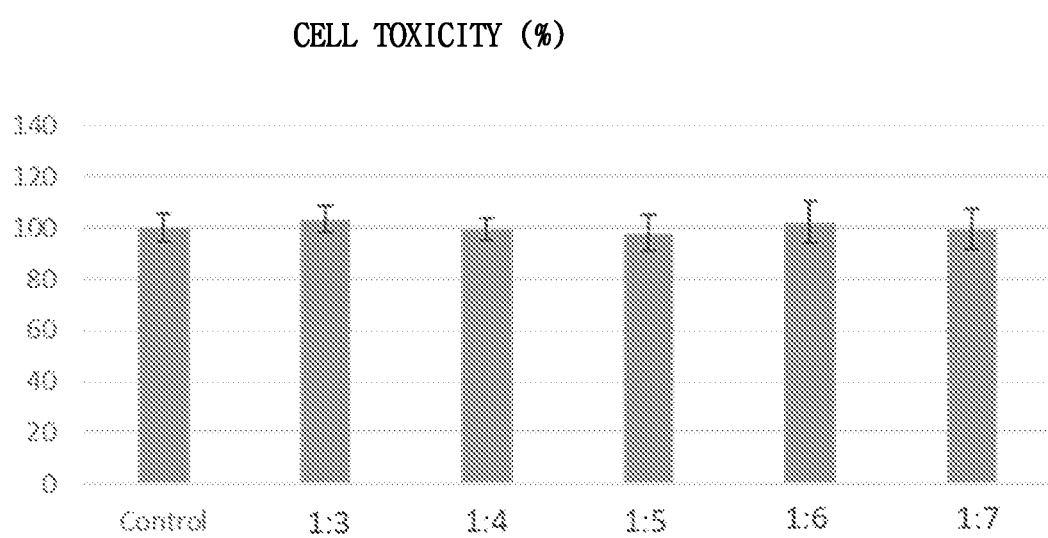
FIG. 6 is a graph illustrating cytotoxicity according to a mixing ratio of ethanol for alcoholic beverage production.
Figure 7:
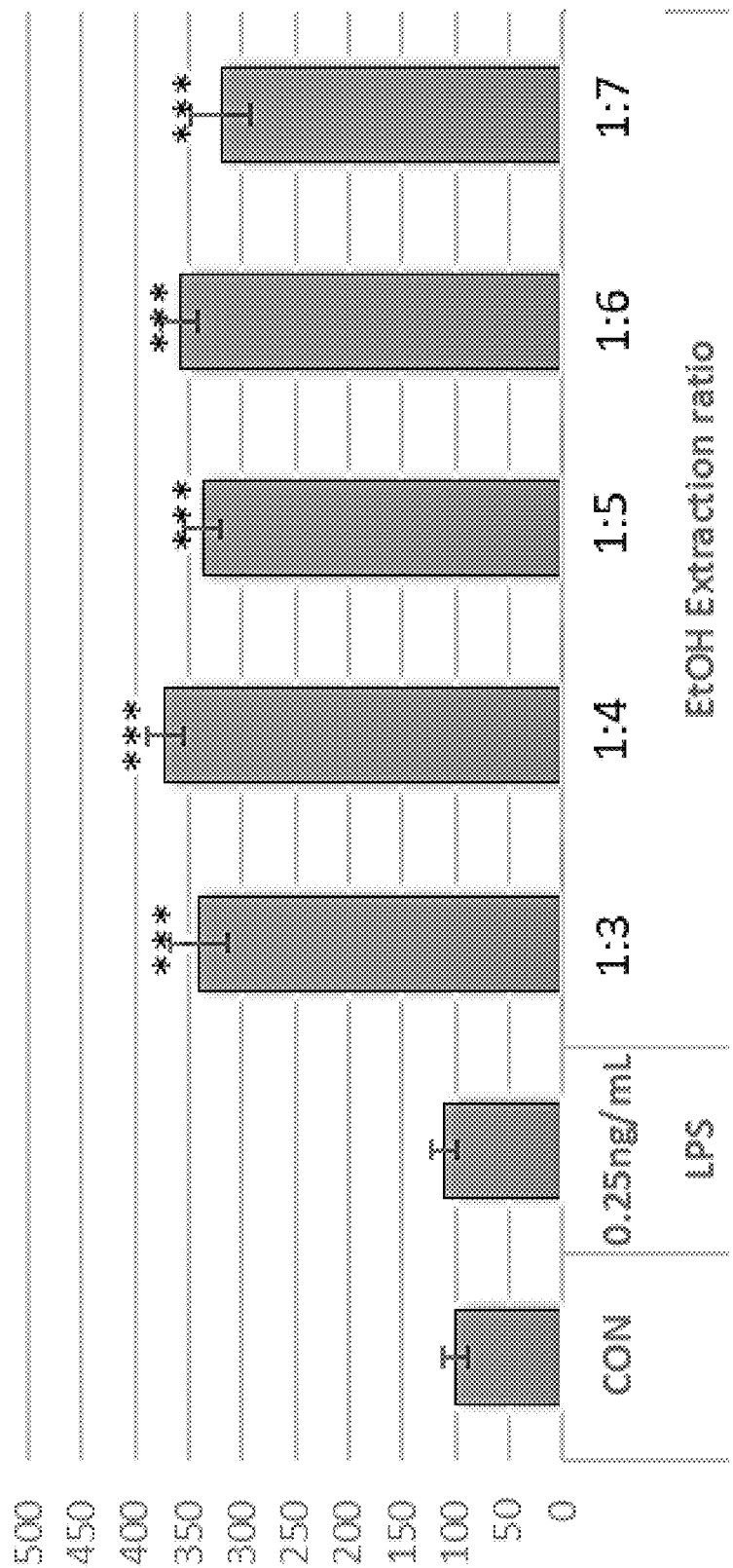
FIG. 7 is a graph illustrating NO production according to the mixing ratio of ethanol for alcoholic beverage production.

FIG. 4 is a graph illustrating the production yield according to a mixing ratio of ethanol for alcoholic beverage production, FIG. 5 is a graph illustrating a total sugar content according to the mixing ratio of ethanol for alcoholic beverage production, and FIG. 6 is a graph illustrating cytotoxicity according to a mixing ratio of ethanol for alcoholic beverage production. FIG. 7 is a graph illustrating NO production according to the mixing ratio of ethanol for alcoholic beverage production.

Meanwhile, the result of measuring a production yield according to the mixing ratio of ethanol for alcoholic beverage production is shown in Table 4 below.

TABLE 4

| Fermented noni extract:95% ethanol | Production yield (%) | |
| --- | --- | --- |
| 1:3 | 13.49 | ±0.89 |
| 1:4 | 26.97 | ±3.60 |
| 1:5 | 17.99 | ±0.31 |
| 1:6 | 26.49 | ±1.49 |
| 1:7 | 20.83 | ±3.99 |

Referring to FIG. 4 and Table 4, when the ratio of the fermented noni extract and the ethanol for alcoholic beverage production is 1:4, the production yield was the highest.

Meanwhile, the result of measuring a total sugar content according to the mixing ratio of the ethanol for alcoholic beverage production is shown in Table 5 below.

TABLE 5

| Fermented noni extract:95% ethanol | Total sugar content (mg/g, dry weight) | |
| --- | --- | --- |
| 1:3 | 342.28 | ±3.66 |
| 1:4 | 352.69 | ±5.26 |
| 1:5 | 351.73 | ±3.80 |
| 1:6 | 332.86 | ±4.08 |
| 1:7 | 336.60 | ±2.39 |

Referring to FIG. 5 and Table 5, when the ratio of the fermented noni extract and the ethanol for alcoholic beverage production is 1:4, the total sugar content was the highest.

Meanwhile, the result of measuring cytotoxicity according to the mixing ratio of the ethanol for alcoholic beverage production is shown in Table 6 below.

TABLE 6

| Fermented noni extract:95% ethanol | Cytotoxicity (%) | |
| --- | --- | --- |
| Untreated group | 100.0 | ±5.5 |
| 1:3 treated group | 103.4 | ±5.4 |

TABLE 6-continued

| Fermented noni extract:95% ethanol | Cytotoxicity (%) | |
| --- | --- | --- |
| 1:4 treated group | 99.5 | ±4.4 |
| 1:5 treated group | 97.9 | ±6.8 |
| 1:6 treated group | 102.2 | ±8.2 |
| 1:7 treated group | 99.5 | ±7.7 |

Referring to FIG. 6 and Table 6, no cytotoxicity was confirmed in all polysaccharide extracts.

Meanwhile, the result of measuring NO production according to the mixing ratio of the ethanol for alcoholic beverage production is shown in Table 7 below.

TABLE 7

| Fermented noni extract:95% ethanol | NO production (% control) | |
| --- | --- | --- |
| Untreated group | 100.0 | ±12.2 |
| LPS treated group | 110.4 | ±11.9 |
| 1:3 treated group | 341.1 | ±26.9 |
| 1:4 treated group | 371.9 | ±17.8 |
| 1:5 treated group | 336.8 | ±17.7 |
| 1:6 treated group | 358.3 | ±17.0 |
| 1:7 treated group | 319.7 | ±27.2 |

Referring to FIG. 7 and Table 7, when the ratio of the fermented noni extract and the ethanol for alcoholic beverage production is 1:4, the highest NO production value was achieved.

According to the result of Experimental Example 4, NO production was the highest at 371.9% in the 1:4 extract, relative to the control, followed by the 1:6 extract and the 1:3 extract.

In terms of polysaccharide extraction yield and immune-enhancing efficacy, it can be seen that the fermented noni polysaccharide extract is most efficiently obtained when extracted with an ethanol ratio of 1:4.

As described above, the fermented noni polysaccharide extract according to the present invention exhibits higher immune-enhancing activity than the fermented ginseng, normal noni extract, and fermented noni extract. Particularly, a polysaccharide extracted from the fermented noni extract exhibits more than 200% higher immune activity compared to the fermented noni extract.

A fermented noni polysaccharide extract according to the present invention exhibits superior immune-enhancing activity to fermented red ginseng, a general noni extract, or a fermented noni extract. Particularly, the polysaccharide extracted from the fermented noni extract has a high immune activity of 200% relative to the fermented noni extract.

As described above, although the embodiments of the present invention have been described with reference to the accompanying drawings, it should be understood by those of ordinary skill in the art to which the present invention belongs that the present invention may be embodied in different specific forms without changing the technical spirit or essential features of the present invention. Therefore, the embodiments described above should be understood as illustrative in all aspects, not limiting.

What is claimed is:
1. A fermented noni polysaccharide extract, which is a polysaccharide extract prepared from a fermented noni extract,
wherein when a polysaccharide extract aqueous solution is provided at a concentration of 200 µg/mL to

RAW264.7 to macrophages, a Nitric Oxide production value is 200% to 500% relative to RAW264.7 macrophages to which the polysaccharide extract solution is not provided.

2. The fermented noni polysaccharide extract of claim 1, wherein the fermented noni extract is prepared by inoculating noni with at least one strain of *Lactobacillus plantarum, Bifidobacterium lactis, Lactobacillus rhamnosus, Lactobacillus casei, Lactobacillus fermentum, Bifidobacterium breve*, and *Lactococcus lactis* subsp. *lactis*, and the fermented noni polysaccharide extract is prepared by mixing the fermented noni extract with ethanol and then drying the resulting precipitate.

3. The fermented noni polysaccharide extract of claim 1, wherein the fermented noni extract is prepared by being inoculated with a strain of Accession No. KCCM12965P, and the fermented noni polysaccharide extract is prepared by mixing the fermented noni extract with ethanol and then drying the resulting precipitate.

4. The fermented noni polysaccharide extract of claim 1, wherein a solid content of the fermented noni extract is 5 to 40 Brix.

5. The fermented noni polysaccharide extract of claim 2, wherein the concentration of the ethanol ranges from 90 to 97%, and a mixing volume ratio of the fermented noni extract and the ethanol ranges from 1:3 to 1:7.

6. A food composition for enhancing immune function, comprising the fermented noni polysaccharide extract of claim 1.

7. A method of preparing a fermented noni polysaccharide extract, comprising:

performing fermentation and aging by inoculating noni with lactic acid bacteria;

preparing a fermented noni extract from the fermented noni obtained by fermentation and aging at 35 to 40° C., for at least 600 hours;

mixing the fermented noni extract with ethanol;

obtaining a polysaccharide precipitate after mixing the fermented noni extract with the ethanol; and obtaining a dry powder of the fermented noni polysaccharide extract using the polysaccharide precipitate.

8. The method of claim 7, wherein the lactic acid bacteria are at least one of *Lactobacillus plantarum, Bifidobacterium lactis, Lactobacillus rhamnosus, Lactobacillus casei, Lactobacillus fermentum, Bifidobacterium breve*, and *Lactococcus lactis* subsp. *lactis*, and a solid content of the fermented noni extract is 5 to 40 Brix.

9. The method of claim 7, wherein the lactic acid bacteria are a strain of Accession No. KCCM12965P, and a solid content of the fermented noni extract is 5 to 40 Brix.

10. The method of claim 7, wherein the mixing volume ratio of the fermented noni extract and the ethanol is 1:3 to 1:7.

* * * * *